US011078956B2

(12) United States Patent
Edelmann et al.

(10) Patent No.: US 11,078,956 B2
(45) Date of Patent: Aug. 3, 2021

(54) ROLLING-ELEMENT BEARING UNIT, CAGE, AND INSTALLATION METHOD

(71) Applicant: AKTIEBOLAGET SKF, Gothenburg (SE)

(72) Inventors: Ludwig Edelmann, Sulzthal (DE); Dominic Namyslo, Gädheim (DE); Matthias Schuler, Stadtlauringen (DE); Johannes Zang, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/703,134

(22) Filed: Dec. 4, 2019

(65) Prior Publication Data

US 2020/0217360 A1    Jul. 9, 2020

(30) Foreign Application Priority Data

Jan. 8, 2019    (DE) .................... 102019200134.3

(51) Int. Cl.
*F16C 33/58*    (2006.01)
*F16C 33/46*    (2006.01)
*F16C 19/36*    (2006.01)
*F16C 33/78*    (2006.01)
*F16C 33/60*    (2006.01)

(52) U.S. Cl.
CPC ........ *F16C 19/364* (2013.01); *F16C 33/4605* (2013.01); *F16C 33/467* (2013.01); *F16C 33/605* (2013.01); *F16C 33/7813* (2013.01); *F16C 33/58* (2013.01); *F16C 2326/20* (2013.01)

(58) Field of Classification Search
CPC .... F16C 33/4605; F16C 33/60; F16C 33/605; F16C 33/7813; F16C 19/364; F16C 41/04; F16C 2226/74; F16C 2326/20; F16C 33/467; F16C 33/58; F16C 33/3806
See application file for complete search history.

(56) References Cited

U.S. PATENT DOCUMENTS

| | | | | |
|---|---|---|---|---|
| 4,136,916 A | * | 1/1979 | Musselman | F16C 19/225 384/560 |
| 4,350,398 A | * | 9/1982 | Schulz | F16C 19/364 384/569 |
| 4,523,862 A | * | 6/1985 | Yasui | F16C 19/364 384/564 |
| 8,172,464 B2 | * | 5/2012 | Matsushita | F16C 19/364 384/571 |

(Continued)

FOREIGN PATENT DOCUMENTS

| EP | 1275866 A1 | * | 1/2003 | |
| JP | 2003028164 A | * | 1/2003 | .............. F16C 43/04 |

OTHER PUBLICATIONS

Machine Translation of EP1275866A1 (Year: 2003).*

*Primary Examiner* — Alan B Waits
(74) *Attorney, Agent, or Firm* — J-Tek Law PLLC; Scott T. Wakeman; Mark A. Ussai

(57) ABSTRACT

A rolling-element bearing unit includes at least one outer ring, at least one inner ring, at least one cage, and a plurality of rolling elements between the outer ring and the inner ring and disposed in pockets of the cage. At least one auxiliary ring is disposed axially adjacent to the outer ring, and the cage includes connecting elements, such as radially outwardly extending lugs, for captively connecting the auxiliary ring to the cage.

14 Claims, 2 Drawing Sheets

(56) References Cited

U.S. PATENT DOCUMENTS

| | | | | |
|---|---|---|---|---|
| 8,783,966 B2* | 7/2014 | Schlegel | ............... | F16C 19/364 |
| | | | | 384/572 |
| 8,801,295 B2* | 8/2014 | Ueno | .................. | F16C 33/4605 |
| | | | | 384/576 |
| 2012/0163748 A1* | 6/2012 | Henneberger | ...... | F16C 33/4605 |
| | | | | 384/564 |
| 2015/0285307 A1* | 10/2015 | Mola | ....................... | F16C 19/26 |
| | | | | 384/473 |
| 2016/0032971 A1* | 2/2016 | Giroud | .................... | F16C 43/06 |
| | | | | 384/585 |
| 2017/0370418 A1* | 12/2017 | Edelmann | ............. | F16C 35/077 |

* cited by examiner

ROLLING-ELEMENT BEARING UNIT, CAGE, AND INSTALLATION METHOD

CROSS-REFERENCE

This application claims priority to German patent application no. 10 2019 200 134.3 filed on Jan. 8, 2019, the contents of which are fully incorporated herein by reference.

TECHNOLOGICAL FIELD

The present disclosure is directed to a rolling-element bearing unit that includes an auxiliary ring for axially extending an outer ring of a bearing and, more specifically, toward a rolling-element bearing unit that includes an auxiliary ring for axially extending an outer ring of a bearing and a bearing cage configured to retain the auxiliary ring on the bearing unit.

BACKGROUND

A rolling-element bearing unit is known that includes an outer ring, an inner ring, a cage, and a number of rolling elements that contact the outer ring and the inner ring and that are disposed in intermediate spaces (pockets) of the cage. The respective outer rings are specifically designed and manufactured for truck wheel bearings. For preassembled bearings the outer ring is axially elongated and the elongated portion is polished in order to be able to manufacture bearings with preinstalled seals.

SUMMARY

An aspect of the disclosure is to provide a rolling-element bearing unit of the above-described type having increased efficiency.

A rolling-element bearing unit, in particular a wheel bearing unit, is disclosed which includes at least one outer ring, at least one inner ring, at least one cage, and a number of rolling elements that contact the outer ring and the inner ring and that are disposed in intermediate spaces of the cage. The rolling-element bearing unit also includes at least one component, such as an auxiliary ring, that is disposed at an axial end region of the rolling-element bearing unit axially adjacent to the outer ring. In addition, the cage includes at least one connecting unit, which may include a plurality of radially outwardly extending lugs, that connects the component to the cage in a captive manner. According to the disclosure an increased efficiency can be achieved. In particular standardized outer rings can be used despite various requirements as to the geometry and the load-bearing capacity of the rolling-element bearing unit, in particular with respect to its geometry, and these standardized rings can have a lower weight due to their small axial length. Furthermore, in particular a high flexibility and a cost-effective design can be achieved. In addition it is possible to assemble new, made-to-order rolling-element bearing units, in particular for the aftermarket, from parts of various already-manufactured bearings.

Another aspect of the disclosure comprises a rolling-element bearing unit having at least one outer ring, at least one inner ring, at least one cage and a plurality of rolling elements between the outer ring and the inner ring and disposed in pockets of the cage. The unit further includes at least one auxiliary ring that is disposed axially adjacent to the outer ring, and a seal element having a first end in contact with the auxiliary ring and a second end in contact with the inner ring. The cage includes a plurality of radially outwardly extending lugs at a first axial end of the cage, the auxiliary ring includes a radially inwardly projecting flange located axially between the plurality of lugs and the at least one outer ring, and an axial space between the lugs and the at least one outer ring is greater that an axial thickness of the flange.

Further advantages arise from the following description of the drawings. An exemplary embodiment of the invention is depicted in the drawings. The drawings, the description, and the claims contain numerous features in combination. The person skilled in the art will also advantageously consider the features individually and combine them into further meaningful combinations.

DETAILED DESCRIPTION

Figure 1:
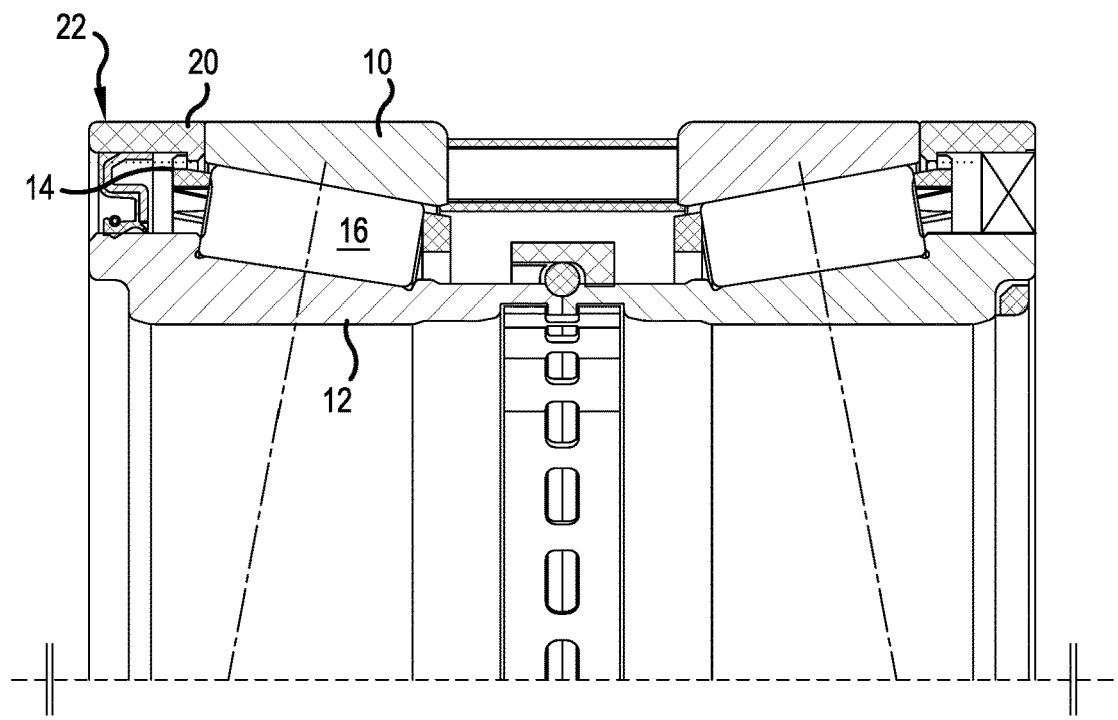
FIG. 1 is an axial section through an rolling-element bearing unit according to the present disclosure.
Figure 2:
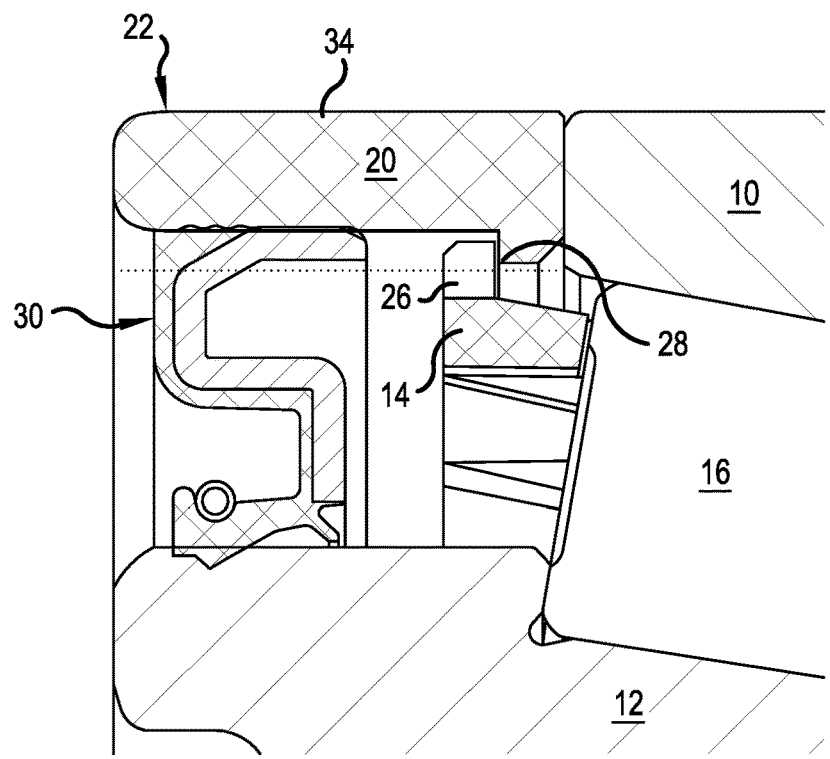
FIG. 2 is an enlarged axial end region of FIG. 1.
Figure 3:
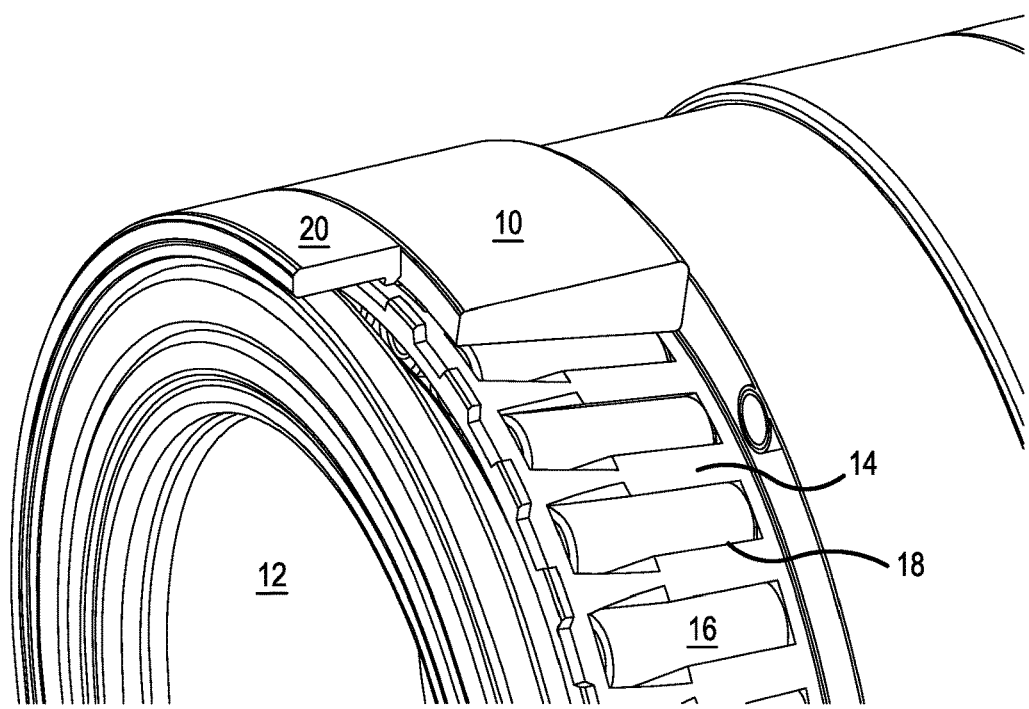
FIG. 3 is a perspective view, partly in section, of the rolling-element bearing unit of FIG. 1.
Figure 4:
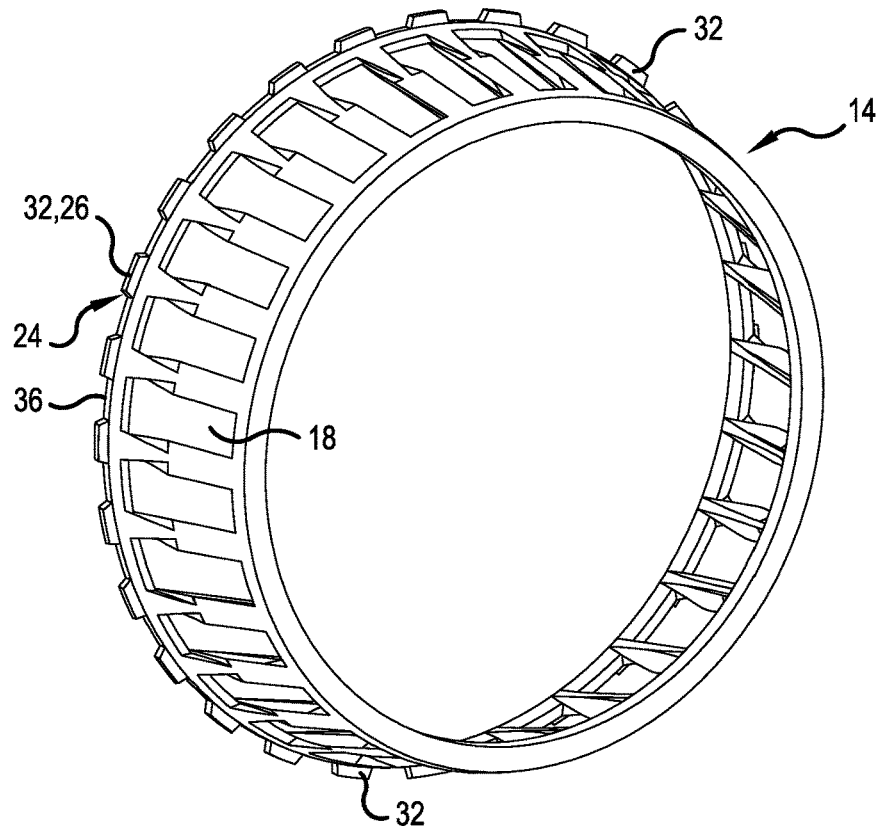
FIG. 4 is a perspective view of the cage of the rolling-element bearing unit of FIG. 1.

FIG. 1 is an axial section through A rolling-element bearing unit according to the present disclosure that is configured as a wheel-bearing unit of a truck and that includes an outer ring 10, an inner ring 12, a cage 14, and a number of rolling elements 16 that form a first rolling-element bearing. In addition to the first rolling-element bearing, the rolling-element bearing unit also includes a second rolling-element bearing that, like the first rolling-element bearing, is configured as a tapered roller bearing. The rolling elements contact the outer ring and the inner ring and are disposed in intermediate spaces (pockets) 18 of the cage (FIGS. 3 and 4). The rolling-element bearing unit includes a component 20 (an auxiliary ring) that is disposed axially adjacent to the outer ring at an axial end region 22 of the rolling-element bearing unit (FIGS. 1 to 3). The cage comprises a connecting unit 24 that connects the component to the cage in an interference-fit and captive manner. The component 20 is configured rotationally symmetrical with respect to an axis of rotation of the rolling-element bearing unit. It includes a region 34 that is configured essentially hollow-cylindrical. The region 34 includes a radially inwardly directed projection (flange) 28 at an axial end that faces the outer ring. Retaining elements 26 of the connecting unit engage behind the projection 28 and thus connect the component captively to the first rolling-element bearing. The projection 28 has clearance in an intermediate space between the retaining elements and the outer ring so that in an installed state, for example, in a truck, the rolling-element bearing unit allows a rotational movement of the cage 14 relative to the component and the outer ring.

The retaining elements 26 are formed as lugs 32 that extend radially outward from an essentially annular region 36 of the cage 14, which annular region 36 forms an axial boundary of the intermediate spaces 18. The lugs 32 are disposed uniformly spaced in the circumferential direction of the region 36. The cage has its largest diameter at the annular region 36.

A seal 30 is pressed-in into the component. The component is made of fiberglass-reinforced plastic. The connecting unit, the projection 28, and the property of the seal 30 of being pressed-in into the component effect a certain centering of the component relative to the outer ring 10.

At a further axial end region that opposes the axial end region 22, the rolling-element bearing unit includes a further component (auxiliary ring) that is identical to the component 20 and is attached in the same manner to the second rolling-element bearing.

In the state described, the rolling-element bearing unit is transportable and is directly installed into a hub, without the need of further tools, by a pressing that is effected by exerting a pressure on the component 20. The component 20 is then attached in the hub by a press-fit, and specifically such that, as described above, the cage can rotate relative to the outer ring 10.

Due to a certain selection of an axial length of the component 20, the same type of outer ring can respectively be used for different required axial extension lengths of the rolling-element bearing unit, which saves costs. In particular, a standard outer ring can be used here.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling-element bearing units.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Outer ring
12 Inner ring
14 Cage
16 Rolling element
18 Intermediate space
20 Component
22 End region
24 Connecting unit
26 Retaining element
28 Projection
30 Seal
32 Lug
34 Region
36 Region

What is claimed is:

1. A rolling-element bearing unit comprising:
at least one outer ring,
at least one inner ring,
at least one cage,
a plurality of rolling elements between the outer ring and the inner ring and disposed in pockets of the cage, and
at least one auxiliary ring that is disposed axially adjacent to the outer ring,
wherein the cage includes a plurality of radially outwardly projecting lugs captively connecting the auxiliary ring to the cage, wherein the at least one inner ring and the at least one outer ring are configured such that the plurality of rolling elements cannot contact the auxiliary ring.

2. The rolling-element bearing unit according to claim 1, wherein the at least one auxiliary ring and the plurality of lugs are configured such that the cage is rotatable relative to the auxiliary ring.

3. The rolling-element bearing unit according to claim 1, wherein the plurality of lugs engage behind at least one projection of the auxiliary ring.

4. The rolling-element bearing according to claim 1, wherein the lugs are disposed at a first axial end of the cage.

5. The rolling-element bearing according to claim 4, wherein the auxiliary ring includes a radially inwardly projecting flange located axially between the plurality of lugs and the at least one outer ring.

6. The rolling-element bearing according to claim 5, wherein an axial space between the lugs and the at least one outer ring is greater than an axial thickness of the flange.

7. The rolling-element bearing according to claim 6, wherein the lugs are evenly circumferentially spaced.

8. The rolling-element bearing unit according to claim 1, including a seal element mounted on the auxiliary ring and extending radially inward toward or to the inner ring.

9. The rolling-element bearing unit according to claim 1, wherein the auxiliary ring comprises a fiberglass-reinforced plastic.

10. A truck including the rolling-element bearing unit according to claim 1.

11. The rolling-element bearing unit according to claim 1, wherein the cage comprises:
a first side ring having a first diameter;
a second side ring axially spaced from the first side ring and having a second diameter less than the first diameter; and
a plurality of bridges connecting the first side ring to the second side ring;
wherein the plurality of radially outwardly projecting lugs are disposed on the first side ring.

12. The rolling-element bearing according to claim 1, wherein the lugs are evenly circumferentially spaced.

13. A rolling-element bearing unit comprising:
at least one outer ring,
at least one inner ring,
at least one cage,
a plurality of rolling elements between the outer ring and the inner ring and disposed in pockets of the cage,
at least one auxiliary ring that is disposed axially adjacent to the outer ring, and
a seal element having a first end in contact with the auxiliary ring and a second end in contact with the inner ring,
wherein the cage includes a plurality of radially outwardly extending lugs at a first axial end of the cage, wherein the auxiliary ring includes a radially inwardly projecting flange located axially between the plurality of lugs and the at least one outer ring, and wherein an axial space between the lugs and the at least one outer ring is greater than an axial thickness of the flange.

14. The rolling-element bearing according to claim 13, wherein the at least one inner ring and the at least one outer ring are configured such that the plurality of rolling elements cannot contact the auxiliary ring.

\* \* \* \* \*